United States Patent Office 3,154,47!
Patented Oct. 27, 196₄

3,154,475
PROCESS FOR THE PRODUCTION OF
PRISTINAMYCIN
Denise I. Mancy, Charenton, and Léon Ninet and Jean Preud'homme, Paris, France, assignors to Rhone-Poulenc S.A., Paris, France, a corporation of France
No Drawing. Filed June 22, 1962, Ser. No. 204,601
Claims priority, application France June 27, 1961
4 Claims. (Cl. 195—80)

This invention relates to the preparation of an antibiotic, hereinafter designated by the number 7293 RP and named "pristinamycin."

The antiobiotic substance 7293 RP is composed essentially of two constituents which are identical with certain of the principal constituents of already known antibiotics, such as streptogramin, staphylomycin or antibiotic PA 114 [cf. in particular D. C. Hobbs and W. D. Celmer, Nature, 187, 598 (1960)], and it possesses antibacterial properties similar to those of these already known antibiotics.

More particularly, the antibiotic substance 7293 RP is soluble in methanol, ethanol, acetone, ethyl acetate, and chloroform, poorly soluble in water and insoluble in petroleum ether. It gives negative results in the Tollens, Millon, Sakaguchi, Seliwanoff, Fehling's solution and ninhydrin reactions, and positive results in the ferric chloride, Ehrlich and Folin-Denis reactions.

It contains carbon, hydrogen, oxygen and nitrogen and its elemental composition is C=61.95–62.25%; H=6.8–7%; O=20–20.5%; N=9.25–9.40%.

It is characterised by the physical properties given below:

Appearance _____ Amorphous pale yellow powder.
Melting point (Maquenne block) __ 151–153° C.
Optical rotation ___ $[\alpha]_D^{25} = -130°$ (c.=0.5, methanol).
Optical rotation ___ $[\alpha]_D^{25} = -150°$ (c.=1, chloroform).

Paper chromatography of 7293 RP under various conditions shows that this antibiotic contains two active substances which may be isolated by counter-current distribution. Study of these two substances has shown that they are identical with the compounds PA 114A and PA 114B described by W. D. Celmer and B. A. Sobin, Antibiotics Annual, p. 437 (1955–1956).

The antibiotic activity of the antibiotic substance 7293 RP against Gram positive organism infections is identical to that of streptogramin, staphylomycin and antibiotic PA 114. The two constituents isolated from 7293 RP possess, as has already been shown for the compounds PA 114A and PA 114B, a synergistic activity.

It has been found that the antibiotic substance 7293 RP may be prepared by the culture under artificial conditions of a micro-organism, hereinafter identified more completely, called "strain 5647" or *Streptomyces pristinaespiralis*. A specimen of this micro-organism, which has not previously been described, has been deposited at the Northern Regional Research Laboratory, Peoria, Illinois (U.S.A.), where it has been given the reference NRRL 2958.

According to the present invention, therefore, there is provided a process for the production of the antibiotic substance herein designated 7293 RP, which comprises cultivating the micro-organism identified as strain 5647 or NRRL 2958, or a mutant thereof, on a nutrient medium and separating the antibiotic product formed during the course of the culture.

The productive organism of the antibiotic substance 7293 RP, identified as strain 5647 or NRRL 2958, was isolated from a soil sample taken at San Carlos (Cordoba) in Argentina. The method of isolation was as follow: The soil sample was suspended in sterile distilled wate and the suspension then diluted to various concentration: A small volume from each dilution was spread on th surface of Petri dishes containing Emerson's nutritiv medium or other appropriate medium. After incubatio for several days at 26° C. the colonies of micro-organisrr to be isolated were pricked out onto agar slopes to obtai more abundant cultures.

The morphological characteristics of strain 5647 wi be defined hereinafter. The culture characteristics an biochemical properties of the strain 5647 have been e) amined on the nutritive agars and nutritive broths no: mally used. The observations made are listed in th table below; unless otherwise indicated, they relate t cultures of two to three weeks at 26° C. which hav reached a good state of development.

Table

Microscopic examination: The strain 5647 possesses tr classic organisation of the Streptomyces. This strai forms elongated spores of oval or cylindrical form wit more or less rounded ends measuring about 0.4 1 0.6μ/0.9 to 1.2μ. The sporiferous filaments are flex₁ ous and for the most part their extremities curve i the form of a hook or, again, form a loop or roll u to form a very loose spiral, which is very open, of single turn or occasionally more. This mode of spor₁ lation may be observed on Bennett's agar, oatmeal ag₂ and Pridham's tomato extract as well as glucos₁ asparagine agar. It leads this strain to be placed i the section Rectinaculum-Apertum of Pridham's class fication (Applied Microbiology, 6, 52–79, 1958).

Temperature of development: Grows well from 30° C. t 37° C.

Smell: Non-existent or extremely weak earthy smell.

Culture on milk:
  Pure milk—
    At 30° C.: ring of yellowish-white vegetati\ mycelium. No aerial mycelium. Parti: peptonization in 14 days; pH changes froı 6.4 to 7.8.
    At 37° C.: vegetative mycelium in the form ( a yellowish ring. No aerial mycelium. Peȷ tonization almost complete in 14 days; p. changes from 6.4 to 7.8.
  Milk with bromocresol—
    At 30° C.: vegetative mycelium in the form ( a greyish-white ring. No aerial myceliur Violet colouration of bromocresol; p. changes from 6.4 to 8.1. Partial peptoniz tion in 14 days.
    At 37° C.: vegetative mycelium in the form ( a greyish ring. No aerial mycelium. Pe: tonization almost complete in 14 days. Viol colouration of bromocresol; pH changes fro 6.4 to 7.6.
  Milk with methylene blue—
    At 30° C.: development very poor. Yellowi: ring of vegetative mycelium. No aerial m celium. No observable change in appea ance. No reduction in blue colouratio pH changes from 6.4 to 7.1 in 14 days.
    At 37° C.: poorly-developed yellowish ring ( vegetative mycelium. Partial flocculatic and slight peptonization in 14 days. Bh colouration becomes green. pH chang from 6.4 to 6.6.

Nitrate broth:
  Waksman's glucose-nitrate broth—

At 30° C.: vegetative mycelium white in the form of a fragmented ring and pellicle. No aerial mycelium. No soluble pigment. Reaction for nitrites: strongly positive.

At 37° C.: vegetative mycelium white in the form of a slight ring and pellicle; several sedimentary flakes. No aerial mycelium. No soluble pigment. Reaction for nitrites: strongly positive (tested after 14 days).

Czapek's synthetic broths:
  Czapek's glucose broth—
    At 30° C.: vegetative mycelium in the form of a white ring and pellicle. No aerial mycelium. Soluble pigment: traces, yellowish. Reaction for nitrites: positive.
    At 37° C.: vegetative mycelium white, in the form of a slight ring with several colonies on the surface. No aerial mycelium. Soluble pigment: very slight, yellowish. Reaction for nitrites: positive.
  Czapek's sucrose broth—
    At 30° C.: vegetative mycelium white, in the form of a thick ring and pellicle. No aerial mycelium. Soluble pigment: weak, yellowish. Reaction for nitrites: positive (after 2 days of culture).
    At 37° C.: vegetative mycelium white, in the form of a ring. Several colonies on the surface and several sedimentary flakes. No aerial mycelium. Soluble pigment: weak, light yellow. Reaction for nitrites: strongly positive (after 2 days of culture).

Tryptone broth: At 30° C. and at 37° C.—growth very poor—limited to several sedimentary flakes. No soluble pigment.

Gelatin:
  Pure gelatin (12% aqueous solution)—
    At 30° C.: good development. Greyish-white vegetative mycelium pellicle. Aerial mycelium greyish-white, moderate. A small number of flakes penetrating into the agar. Soluble pigment: light yellow-brown; small quantity. Liquefaction complete in 7 days.
    At 37° C.: ring and several isolated colonies on the surface. Vegetative mycelium greyish-white. Aerial mycelium non-existent or some slight whitish traces. Soluble pigment: light brownish yellow; quantity very small. Liquefaction complete in 7 days.
  Waksman's gelatine with meat extract—
    At 30° C.: vegetative mycelium ring yellowish-white. No aerial mycelium. Several immersed flakes. Soluble pigment: intense light yellow. Liquefaction complete in 7 days.
    At 37° C.: vegetative mycellium ring yellowish-white to dark yellow. Several immersed flakes. No aerial mycelium. Soluble pigment: intense light yellow. Liquefaction complete in 7 days.
  Wakman's gelatine with glucose—
    At 30° C.: vegetative mycelium ring yellowish to pink. Several flakes which settle to the bottom. No aerial mycelium. Soluble pigment: yellow. Liquefaction complete in 7 days.
    At 37° C.: vegetative mycelium ring yellowish to pink. Several flakes which settle to the bottom. No aerial mycelium. Soluble pigment: yellow. Liquefaction complete in 7 days.

Potato: Vegetative mycelium yellow, very folded and flaking. Aerial mycelium moderate, whitish. Soluble pigment: yellow, in the cone of potato and in the underlying liquid.

Agar with starch:
  Wakman's starch agar A—
    At 30° C.: fairly good growth. Colonies with fairly regular, very slightly raised, edges. Several folds radiating from the edge to the centre of the colony. Underside brown to black. Aerial mycelium grey with narrow white border. Hydrolysis of the starch very slight, around the colonies. No soluble pigment.
    At 37° C.: poorer growth than at 30° C. Colonies slightly raised, with several radiating folds. Underside light brown to dark brown or blackish. Aerial mycelium little developed, white to greyish on certain colonies only; absent from a certain number. Little hydrolysis of the starch.

Nutritive agar:
  At 30° C.: development poor. Fairly large colonies. Vegetative mycelium brownish-yellow, very sparse, with radial and concentric folds. Underside light brownish yellow. Aerial mycelium absent or whitish traces on some colonies. No soluble pigment.
  At 37° C.: appearance fairly similar but growth rather better; traces of grey sporulation on certain colonies.

Bennett's agar:
  At 30° C.: large colonies with irregular edges, surface folded, but without radial folds. Vegetative mycelium yellowish beige; underside yellowish beige to light brown or greyish. Aerial mycelium whitish, very little developed on certain colonies; on other colonies grey sporulation and white borders. No soluble pigment.
  At 37° C.: poorer development than at 30° C. Colonies with irregular surfaces. Vegetative mycelium light yellowish brown. Aerial mycelium poorly developed, whitish to greyish, absent from the majority of colonies. No soluble pigment.

Glucose-peptone agar:
  Wakman's glucose-peptone agar A—
    At 30° C.: good development. Large raised colonies with irregular edges—do not penetrate the agar. Vegetative mycelium folded, tannin colour. Underside yellowish. No soluble pigment. No aerial mycelium; no sporulation.
    At 37° C.: as at 30° C. but edges more irregular. Underside yellowish. No soluble pigment. No aerial mycelium. No small cracks.
  Waksman's glucose-peptone agar B—
    At 30° C.: large colonies, raised at the centre, with fairly regular, sharply defined edges, not penetrating the agar, with radial folds. Vegetative mycelium light yellowish. Underside light yellowish to light brownish yellow. Certain colonies are without aerial mycelium; others have white aerial mycelium and light-grey sporulation at the centre. No soluble pigment.
    At 37° C.: comparable appearance but poorer development. No small cracks.

Tyrosine agar:
  At 30° C.: very large flat colonies. Light brown vegetative mycelium, folded at the centre of the colony. Underside light yellowish brown. Aerial mycelium with light grey sporulation and white border on certain colonies. A small amount of light brown soluble pigment. Very sharply defined solubilisation of the tyrosine, 2 to 4 mm, around the colony.
  At 37° C.: as at 30° C.

Czapek's synthetic agars:
Czapek's sucrose agar—
At 30° C.: large colonies. Yellowish to yellow-brown vegetative mycelium, folded in all directions and exfoliating. Underside light brown-yellow to blackish brown. Light greyish aerial mycelium and sporulation on some colonies only. Soluble pigment: clear yellow-brown.
At 37° C.: appearance similar to that at 30° C. but rather poorer development.
Czapek's glucose agar:
At 30° C.: large colonies. Dark brown vegetative mycelium, raised at the centre, folded in all directions and tending to break. Underside dark brown almost black. Aerial mycelium in greyish-white traces, particularly on the periphery of the colonies. Distinct yellow-brown soluble pigment.
At 37° C.: similar appearance to that at 30° C., but rather poorer development.
Calcium maleate agar:
At 30° C.: development moderate. Colonies with ragged edges. Underside yellow-brown to blackish brown. White aerial mycelium in successive corona around the periphery of the colonies. Centres of the colonies raised with grey sporulation. No soluble pigment. Good solubilisation of calcium maleate for 3 to 4 mm. around the colonies.
At 37° C.: as at 30° C.

By following the method of Pridham and Gottlieb (J. of Bact. 56, 107–114, 1948), it is found that strain 5647 utilises, moderately or well, the following compounds as sources of carbon: xylose, arabinose, rhamnose, fucose, glucose, galactose, fructose, mannose, lactose, maltose, sucrose, trehalose, cellobiose, raffinose, dextrin, inulin, starch, glycogen, glycerine, mannitol and inositol. The following are not utilised: sorbose, esculine, glycol, erythritol, adonitol, dulcitol, sorbitol, ethanol, sodium formate, sodium acetate, sodium oleate, succinic acid and calcium gluconate.

As sources of nitrogen, the following are utilised: sodium nitrate, sodium nitrite, ammonium sulphate, adenosine, urea, asparagine, glycine, alanine, valine, glutamic acid, arginine, lysine, serine, threonine, phenylalanine, tyrosine, proline, hydroxyproline and histidine. Acetamide, succinamide, benzamide, creatine, creatinine, methionine and betaine are not utilised.

The culture of strain 5647 may be carried out by any method of surface or submerged aerobic culture but the latter is preferred for reasons of convenience. Preferably the culture is effected under aerobic conditions at a pH between 6.0 and 7.8 and a temperature of 23–35° C. at an aeration rate of 0.3 to 2.0 litres of air per litre of broth per minute.

The fermentation medium should contain, essentially, an assimilable source of carbon and an assimilable source of nitrogen, inorganic elements and, optionally, growth-promoting factors, all these elements being introduced in the form of well defined substances or by complex mixtures, such as are found in biological substances of diverse origins. Media based upon soya meal and glucose give particularly good results.

Among the inorganic substances added, certain may have a buffering or neutralising effect such as alkali metal and alkaline earth metal phosphates or calcium and magnesium carbonates. Others contribute to the ionic equilibrium necessary to the development of the organism and the formation of the antibiotic, such as alkali metal and alkaline earth metal chlorides and sulphates. In addition, certain of them act more specially as activators of the metabolic reactions of the organism these are the salts of zinc, cobalt, iron, copper and manganese.

The antibiotic substance 7293 RP may be isolated from the fermentation cultures by the classic methods of solvent extraction. It is particularly advantageous to follow the following procedure: filtration of the culture after acidification to about pH 3, neutralisation of the filtrate to about pH 7, extraction with dichloroethane and concentration and precipitation of the crude antibiotic by addition of a poor solvent such as petroleum ether. The crude antibiotic thus obtained may then be purified by known methods, such as chromatography.

The following examples will serve to illustrate the invention. In these examples the activity is expressed in units per mg. of solid product (u./mg.) or ml. of solution (u./ml.). The unit is the smallest quantity of product which, dissolved in 1 ml. of an appropriate culture medium, inhibits the growth of Staphylococcus 209 P under given conditions.

*Example I*

A 170 litre fermentation vessel is charged with the following:

Enzymatic casein hydrolysate _____ g__ 1,200
Glucose (hydrated) _____ g__ 1,200
Meat extract _____ g__ 360
Tap water, q.s.p. 100 litres.

The pH of this medium is adjusted to about 7.2 with 10 N sodium hydroxide solution (35 ml.) and then soya oil (60 ml.) is added.

The culture medium is sterilised by the passage of steam at 120° C. for 40 minutes and the pH is then about 7.1. The medium is then seeded with a culture (250 ml.), in an agitated Erlenmeyer flask, of the strain 5647. The temperature is controlled to 26–27° C. and the aeration to 5 m.³/hour. The pH of the medium remains stable for 15 hours, falls suddenly to reach 4.95 after 22 hours of culture and then rises again. The development of the organism commences at about the 15th hour and the culture is suitable for seeding the production culture 26 hours after being itself seeded.

The production culture is carried out in an 800 litre fermentation vessel containing the following substances:

Soya meal _____ kg__ 17.75
Distiller's solubles _____ kg__ 2.25
Sodium chloride _____ kg__ 4.5
Tap water, q.s.p. 360 litres.

The pH of the medium thus obtained is adjusted to pH 6.55 with sodium hydroxide solution ($d=1.33$; 220 ml.). Soya oil (1,800 ml.) and calcium carbonate (2.25 kg.) are then added.

The medium is then sterilised by the passage of steam for 40 minutes at 120° C. After cooling, a sterile solution (50 litres) of glucose (containing 11.4 kg. glucose hydrate) is added under sterile conditions.

The pH of the medium thus prepared is 7.1 and the total volume is then 450 litres. After adjusting the temperature to 26–27° C., the medium is seeded with the culture (40 litres) in the 170 litre fermentation vessel. Aeration is maintained at 15 m.³/hour.

The pH falls from 7.1 to 6.75 in 4 hours and then slowly rises to reach 6.95 after 24 hours of culture. The production of the antibiotic occurs between, approximately, the 18th and 24th hours of the culture. The fermentation is terminated after 24 hours of culture, the activity of the medium then being 1,190 u./ml.

*Example II*

The fermentation broth (420 litres; titre 1,190 u./ml.) obtained in Example I is placed in a vessel equipped with a stirrer and the pH adjusted to 3 by the addition of 6 N hydrochloric acid. A filtration adjuvant (18.5 kg.) is then added and the mixture obtained is filtered. The filter-cake is washed with water (50 litres). The filtrate (420 litres) is adjusted to pH 7 by means of dilute sodium hydroxide solution and then extracted with dichloroethane (96 litres) in a group of 2-extraction-stage counter-current centrifuges. The organic solution is concentrated under reduced pressure to 1 litre. The concentrate is treated with petroleum ether (10 litres) and the precipitate obtained is separated, washed and dried. A crude product (52.5 g.) is thus obtained having an activity of 7,600 u./mg.

*Example III*

The preceding crude product (50 g.; titre 7,600 u./mg.) is dissolved in dichloroethane (2.5 litres) and the solution thus obtained is filtered and then passed through a column containing granulated charcoal (0.75 litre) previously wahsed with dichloroethane (1.25 litres). The chromatogram is developed and eluted with dichloroethane (4.5 litres). The central fraction (2.5 litres) is concentrated under reduced pressure to 250 ml., the temperature being kept below 35° C. The concentrate obtained is filtered and then treated with petroleum ether (3.75 litres). The precipitate formed is separated, washed with petroleum ether and dried. A purified product (35 g.) is thus obtained in the form of an amorphous pale yellow powder having an activity of 8,100 u./mg.

We claim:

1. A process for the production of the antibiotic pristinamycin, which has melting point of 151–153° C., which possesses an optical rotation $[\alpha]_D^{25} = -130°$ (c.=0.5, methanol) and $[\alpha]_D^{25} = -150°$ (c.=1.0, chloroform), which is soluble in methanol, ethanol, acetone, ethyl acetate, and chloroform, is poorly soluble in water and insoluble in petroleum ether, which has elemental analyses C=61.95–62.25%, H=6.8–7%, O=20–20.5% and N=9.25–9.40% and which contains the antibiotic constituents PA 114A and PA 114B, which comprises cultivating the micro-organism *Streptomyces pristinaespiralis* NRRL 2958, on a nutrient medium, and separating the antibiotic product formed during the course of the culture.

2. A process according to claim 1, wherein the culture is effected under aerobic conditions at a pH between 6.0 and 7.8 and a temperature of 23–35° C., and at an aeration rate of 0.3 to 2.0 litres of air per litre of broth per minute.

3. A process according to claim 1, wherein the culture is effected under submerged aerobic conditions at a pH between 6.0 and 7.8 and a temperature of 23–35° C., and at an aeration rate of 0.3 to 2.0 litres of air per litre of broth per minute.

4. A process according to claim 1, wherein the antibiotic is separated from the culture medium by extraction with an organic solvent.

References Cited in the file of this patent

Celmer et al.: Antibiotics Annual, 1955–1956, Medical Encyclopedia, Inc., New York, N.Y., pages 437 to 452. RS 161 A57.